United States Patent
Matthews et al.

(10) Patent No.: US 6,226,667 B1
(45) Date of Patent: *May 1, 2001

(54) METHOD AND APPARATUS FOR PRELOADING DATA IN A DISTRIBUTED DATA PROCESSING SYSTEM

(75) Inventors: Gareth Christopher Matthews, Cedar Park; David Medina, Austin; Allen Chester Wynn, Round Rock, all of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/084,277

(22) Filed: May 26, 1998

(51) Int. Cl.⁷ .............. G06F 15/177; G06F 9/00
(52) U.S. Cl. ............... 709/203; 709/203; 713/1
(58) Field of Search .............. 709/220–222, 709/203, 228; 713/1–2, 100

(56) References Cited

U.S. PATENT DOCUMENTS

| | | | |
|---|---|---|---|
| 4,885,770 | * 12/1989 | Croll | 379/269 |
| 5,146,568 | * 9/1992 | Flaherty et al. | 716/3 |
| 5,367,688 | * 11/1994 | Croll | 713/2 |
| 5,404,527 | * 4/1995 | Irwin et al. | 709/222 |
| 5,444,850 | * 8/1995 | Chang | 709/222 |
| 5,452,454 | 9/1995 | Basu | 395/700 |
| 5,485,609 | * 1/1996 | Vitter et al. | 707/101 |
| 5,530,862 | * 6/1996 | Wadsworth et al. | 713/1 |
| 5,666,293 | * 9/1997 | Metz et al. | 709/220 |
| 5,708,820 | * 1/1998 | Park et al. | 713/323 |
| 5,715,456 | * 2/1998 | Bennett et al. | 713/2 |
| 5,752,042 | * 5/1998 | Cole et al. | 717/11 |
| 5,758,072 | * 5/1998 | Filepp et al. | 709/220 |
| 5,758,165 | 5/1998 | Shuff | 717/11 |
| 5,778,443 | 7/1998 | Swanberg et al. | 711/162 |
| 5,832,283 | 11/1998 | Chou et al. | 713/300 |
| 5,872,968 | 2/1999 | Knox et al. | 713/2 |
| 5,987,506 | 11/1999 | Carter et al. | 709/213 |
| 6,074,435 | * 6/2000 | Rojestal | 717/11 |
| 6,101,601 | * 8/2000 | Matthews et al. | 713/2 |
| 6,108,697 | * 8/2000 | Raymond et al. | 709/218 |
| 6,131,159 | * 10/2000 | Hecht et al. | 713/1 |
| 6,134,616 | * 10/2000 | Beatty | 710/104 |

OTHER PUBLICATIONS

Gralla, P., "How the Internet Works," Ziff–Davis Press, pp. 126–127, 1994.*

Bestavros, Azer "Using Speculation to Reduce Server Load and Service Time on the WWW", pp. 403–410, 1995 Computer CIKM International Conference On Information Communications Review and Knowledge Management. vol. 26, No. 3, pp. 22–36 Jul. 1996.

* cited by examiner

*Primary Examiner*—Zarni Maung
*Assistant Examiner*—Andrew Caldwell
(74) *Attorney, Agent, or Firm*—Duke W. Yee; Jeffrey S. LaBaw

(57) ABSTRACT

A method and apparatus for reducing time needed to initialize a data processing system and to execute applications on the data processing system. In accordance with a preferred embodiment of the present invention, pages for an application are pre-loaded onto a client from a server. The pre-loading of the application includes loading pages that will be required for execution of the application in preparation for hibernation. These pages may include other pages for executable code or data that will be used during execution of the application. Subsequently, the application is executed using the locally stored pages without having to retrieve pages from the server. In addition, an application is provided with an opportunity to prepare itself for hibernation via hibernation notification. For example, the application may read and process files from the server. This processing is done once prior to hibernation and is not required for later executions of the application.

25 Claims, 4 Drawing Sheets

METHOD AND APPARATUS FOR PRELOADING DATA IN A DISTRIBUTED DATA PROCESSING SYSTEM

CROSS REFERENCE TO RELATED APPLICATION

The present invention is related to an application entitled Method and Apparatus For Hibernation Within A Distributed Data Processing System, Ser. No. 09/062,885, filed Apr. 20, 1998, now U.S. Pat. No. 6,101,601, assigned to the same assignee and incorporated herein by reference.

BACKGROUND OF THE INVENTION

1. Technical Field

The present invention relates to an improved distributed data processing system and in particular to an improved method and apparatus for managing data processing systems within a distributed data processing system. Still more particularly, the present invention relates to a method and apparatus for pre-loading data within a distributed data processing system.

2. Description of Related Art

A computer includes both a physical machine, namely the hardware, and the instructions which cause the physical machine to operate, namely the software. Software includes both application and operating system programs. If the program is simply to do tasks for a user, such as solving specific problems, it is referred to as application software. If a program controls the hardware of the computer and the execution of the application programs, it is called operating system software. System software further includes the operating system, the program which controls the actual computer or central processing unit (CPU), and device drivers which control the input and output devices (I/O) such as printers and terminals.

A general purpose computer is fairly complicated. Usually a queue of application programs is present waiting to use the CPU. The operating system will need to determine which program will run next, how much of the CPU time it will be allowed to use and what other computer resources the application will be allowed to use. Further, each application program will require a special input or output device and the application program must transfer its data to the operating system, which controls the device drivers.

A network containing a number of computers may be formed by having these computers, also referred to as "nodes" or "network computers", communicate with each other over one or more communications links, which is an aggregation which is a computer network. Today, many computer workstations are connected to other workstations, file servers, or other resources over a local area network (LAN). Each computer on a network is connected to the network via an adapter card or other similar means, which provides an ability to establish a communications link to the network.

Recently, in a many network computer paradigms, applications are stored on a server and are sent to other network computers (NCs), also referred to as "clients".

A problem exists for network-loaded applications or images. In a network computing environment, when a client's system applications are accessed across the network, a run time problem in the application may occur due to constraints, such as, network traffic, application or image size, or initialization of the image. Such a situation may result in minutes being required to execute an application or portions of the application. In addition, as an application is executed on a client, additional code in the form of pages may be required to continue execution of the application. In such an instance, these additional pages are downloaded from the server, requiring additional access across the network. A "page" is a fixed size block of memory. When a page is used in a paging memory system, a page is a block of memory whose physical address can be changed via mapping hardware.

Therefore, it would be advantageous to have an improved method and apparatus for executing applications across a network.

SUMMARY OF THE INVENTION

It is one object of the present invention to provide an improved distributed data processing system.

It is another object of the present invention to provide an improved method and apparatus for managing data processing systems within a distributed data processing system.

It is yet another object of the present invention to provide a method and apparatus for pre-loading data within a distributed data processing system.

The present invention provides a method and apparatus for reducing time needed to initialize a data processing system and to execute applications on the data processing system. In accordance with a preferred embodiment of the present invention, pages for an application are pre-loaded onto a client from a server. The pre-loading of the application includes loading pages that will be required for execution of the application in preparation for hibernation. These pages may include other pages for executable code or data that will be used during execution of the application. Subsequently, the application is executed using the locally stored pages without having to retrieve pages from the server.

In addition, an application is provided with an opportunity to prepare itself for hibernation via hibernation notification. For example, the application may read and process files from the server. This processing is done once prior to hibernation and is not required for later executions of the application.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
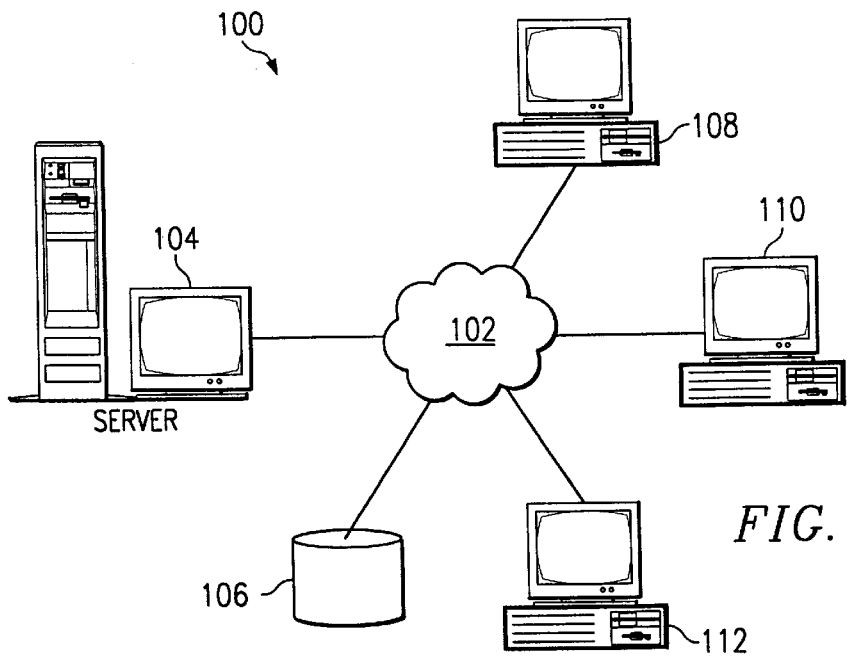
FIG. 1 is a diagram of a distributed data processing system in accordance with a preferred embodiment of the present invention.

With reference now to the figures, and in particular with reference to FIG. 1, a diagram of a distributed data processing system is depicted in accordance with a preferred embodiment of the present invention. Distributed data processing system 100 is a network of computers in which the present invention may be implemented. Distributed data processing system 100 contains a network 102, which is the medium used to provide communications links between various devices and computers connected together within distributed data processing system 100. Network 102 may include permanent connections, such as wire or fiber optic cables, or temporary connections made through telephone connections.

In the depicted example, a server 104 is connected to network 102 along with storage unit 106. In addition, network computers (NCs) 108, 110, and 112 also are connected to network 102. For purposes of this application, a network computer is any computer, coupled to a network, which receives a boot image from another computer coupled to the network and also may be a server managed computer. Server 104 provides data, such as boot files, operating system images, and applications to NCs 108–112. NCs 108, 110, and 112 are clients to server 104. Distributed data processing system 100 may include additional servers, NCs, and other devices not shown. FIG. 1 is intended as an example, and not as an architectural limitation for the processes of the present invention.

Figure 2:
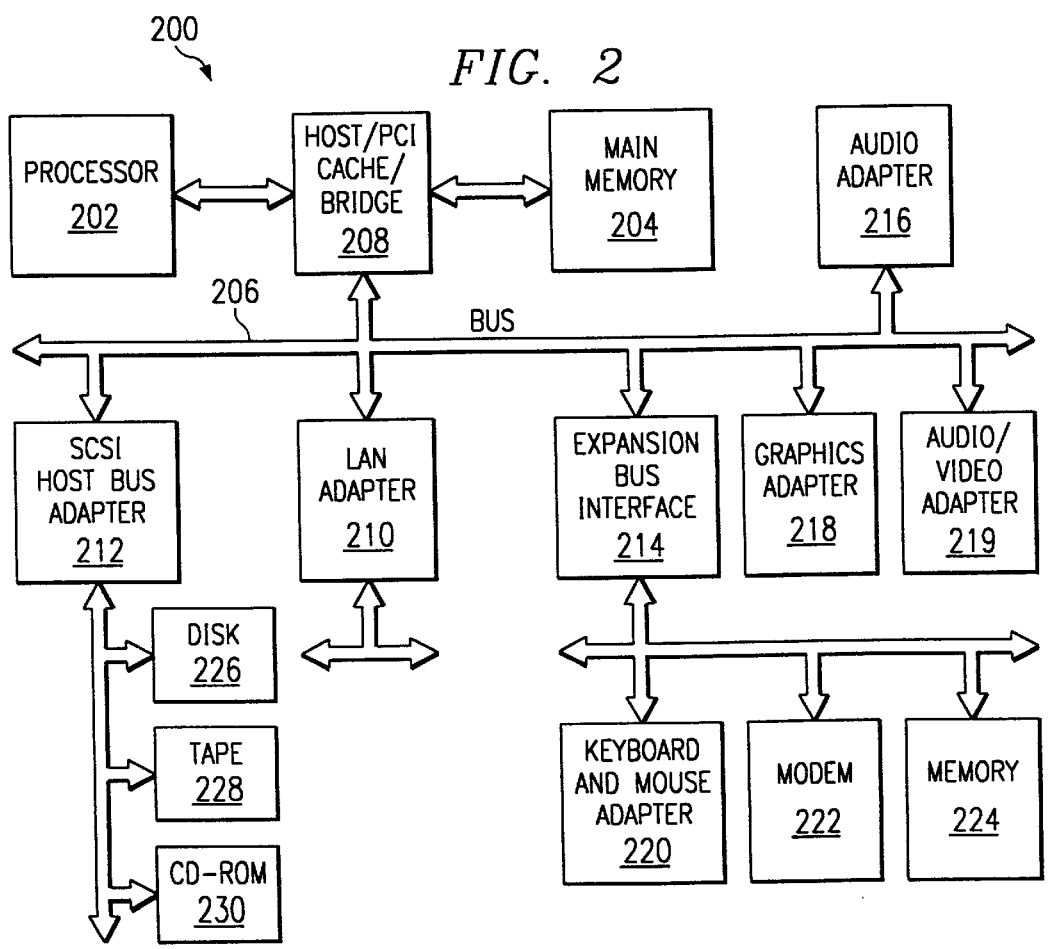
FIG. 2 is a block diagram of a data processing system in which the present invention may be implemented.

Turning next to FIG. 2, a block diagram of a data processing system 200 in which the present invention may be implemented is illustrated. Data processing system 200 employs a peripheral component interconnect (PCI) local bus architecture. Although the depicted example employs a PCI bus, other bus architectures such as Micro Channel and ISA may be used. Processor 202 and main memory 204 are connected to PCI local bus 206 through PCI bridge 208. PCI bridge 208 also may include an integrated memory controller and cache memory for processor 202. Additional connections to PCI local bus 206 may be made through direct component interconnection or through add-in boards. In the depicted example, local area network (LAN) adapter 210, SCSI host bus adapter 212, and expansion bus interface 214 are connected to PCI local bus 206 by direct component connection. In contrast, audio adapter 216, graphics adapter 218, and audio/video adapter (A/V) 219 are connected to PCI local bus 206 by add-in boards inserted into expansion slots. Expansion bus interface 214 provides a connection for a keyboard and mouse adapter 220, modem 222, and additional memory 224. SCSI host bus adapter 212 provides a connection for hard disk drive 226, tape drive 228, and CD-ROM 230 in the depicted example. Typical PCI local bus implementations will support three or four PCI expansion slots or add-in connectors.

Those of ordinary skill in the art will appreciate that the hardware in FIG. 2 may vary depending on the implementation. For example, other peripheral devices, such as optical disk drives and the like may be used in addition to or in place of the hardware depicted in FIG. 2. Implemented as an NC, data processing system 200 may include fewer components than illustrated in FIG. 2. For example, many NCs may be diskless or have only a single storage device, such as hard disk drive 226. Data processing system 200 also may be implemented as a server. The depicted example is not meant to imply architectural limitations with respect to the present invention.

The present invention provides a method and system for minimizing traffic within a distributed data processing system by pre-loading client images for applications onto client network computers for use in a hibernated environment. In the depicted example, the processes of the present invention are implemented in the operating system on the client data processing system.

Figure 3:
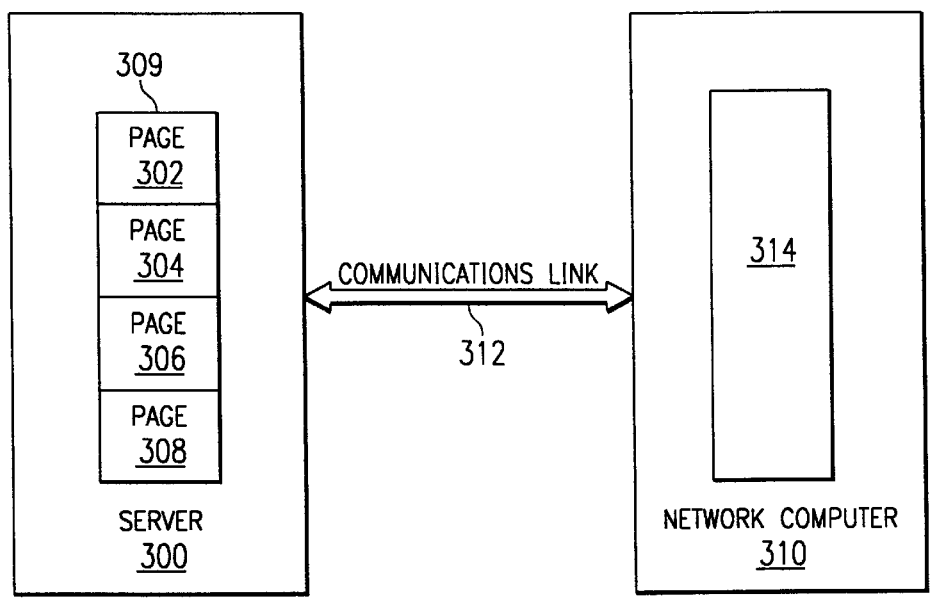
FIG. 3 is a block diagram of components used in managing a network computer in accordance with a preferred embodiment of the present invention.

Turning next to FIG. 3, a block diagram of components used in managing a network computer is depicted in accordance with a preferred embodiment of the present invention. In the depicted example in FIG. 3, server 300 downloads pages 302–308 for application 309 to NC 310 using communications link 312. In the depicted example, a page is a fixed-size block of memory. When used in the context of a paging memory system, a page is a block of memory whose physical address can be changed via mapping hardware. These pages may include execution code and data for an application used on NC 310. Typically, only some pages for the application are initially sent to NC 310. Thus, hibernating NC 310 at this point would provide some benefits at boot up, but would still require accessing server 300 to load any other pages that the application would need during runtime. According to the present invention, in response to NC 310 receiving a hibernation request from server 300, all of the pages for an application would be sent to NC 310. After all of the pages have been sent to NC 310, NC 310 is hibernated in a known or selected state to produce image 314, which may be used to restart NC 310, when NC 310 is restarted and unhibernation is appropriate. These pages are stored in a paging space or paging file in image 314. Hibernation involves saving the state of a computer, such as a NC. Hibernation is implementation specific and the data may be saved in a file or raw I/O format located on a storage device, such as a hard disk drive or a static RAM. More information on hibernation may be found in Method and Apparatus for Hibernation Within A Distributed Data Processing System, serial no. 09/062,885, filed on Apr. 20, 1998.

In this manner, applications are pre-loaded onto NC 310 such that network traffic within the distributed data processing system is reduced by reducing the number of accesses to server 300. In addition, the present invention may notify an application that hibernation will occur and allows the application to perform whatever processes are necessary to prepare for hibernation. These processes may include, for example, reading and processing additional files from the server or processing data. In the depicted example, an application is notified if the application has registered for hibernation notification. In the depicted example, each application individually registers hibernation notification for hibernation.

Figure 4:
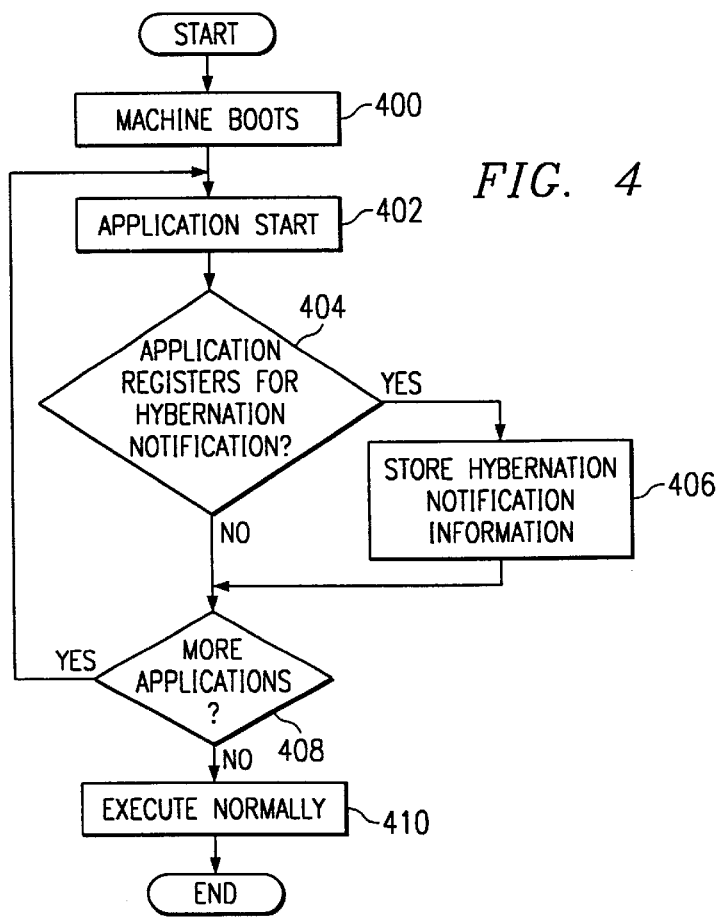
FIG. 4 is a flowchart of a process for registering an application for hibernation notification in accordance with a preferred embodiment of the present invention.

With reference now to FIG. 4, a flowchart of a process for registering an application for hibernation notification is illustrated in accordance with a preferred embodiment of the present invention. The process begins with the booting of the NC (step 400). Thereafter, an application starts (step 402), and a determination is made as to whether the application is one that will register for hibernation notification. (step 404). If the application is to register for hibernation notification it issues an API call. Thereafter hibernation notification information for the application is stored (step 406). Registration involves employing an API to inform the operating system to call a selected function for the application when hibernation occurs. Thereafter, a determination is made as to whether more applications are started (step 408). If more applications are started, the process returns to step 402. Otherwise, the NC executes in a normal fashion (step 410). With reference again to step 404, if the application does not register for hibernation notification, the process proceeds directly to step 408.

Figure 5:
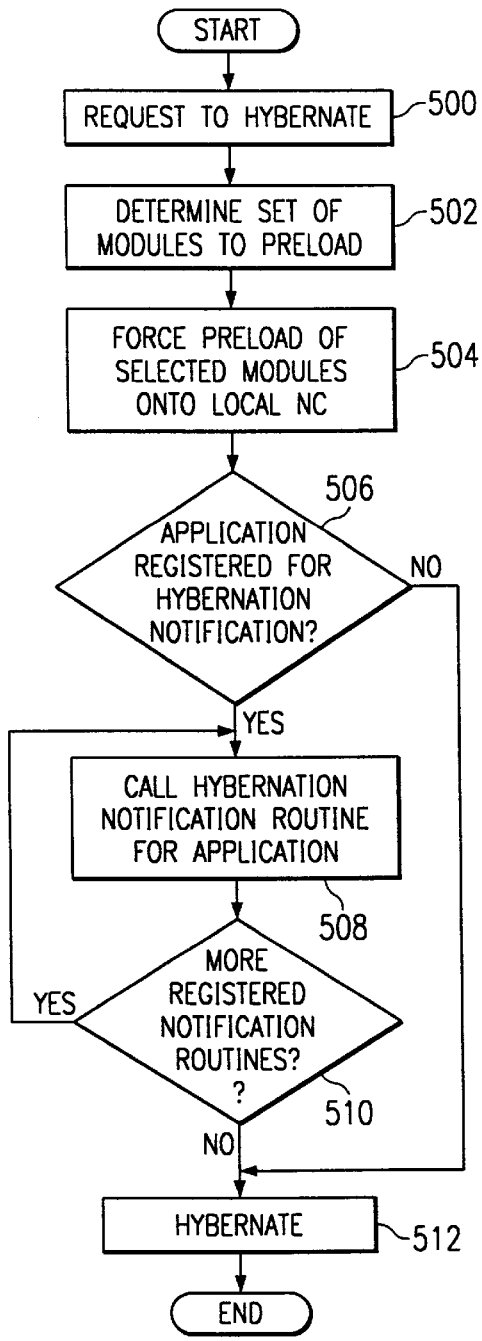
FIG. 5 is a flowchart of a process used by a network computer to pre-load modules from a server in accordance with a preferred embodiment of the present invention.

Turning next to FIG. 5, a flowchart of a process used by a network computer to pre-load modules from a server is depicted in accordance with a preferred embodiment of the present invention. The process begins by receiving a request to hibernate the network computer (step 500). Thereafter, the set of modules that are to be pre-loaded is identified (step 502). These modules may be, for example, executable programs for the application or images containing the executable programs, dynamic link library (DLL) files, or memory pages. The identified modules are then loaded onto the local network computer (step 504). Identified modules are modules that are identified by the system administrator as a set of executables that will normally be executed on a particular network computer. Thereafter, a determination is made as to whether applications are registered for hibernation notification (step 506). If any application has been registered for hibernation notification, the process then calls the hibernation notification routine for the applications (step 508). Calling the hibernation notification routine for an application allows the application to pull and process application specific information, such as, for example, files from the server. A determination is then made as to whether more registered notification routines are present for execution (step 510). If additional hibernation notification routines are present, the process returns to step 508. Otherwise, hibernation of the network computer is initiated (step 512). With reference again to step 506, if no applications are registered for hibernation notification, the process also proceeds to step 512 to initiate hibernation.

Figure 6:
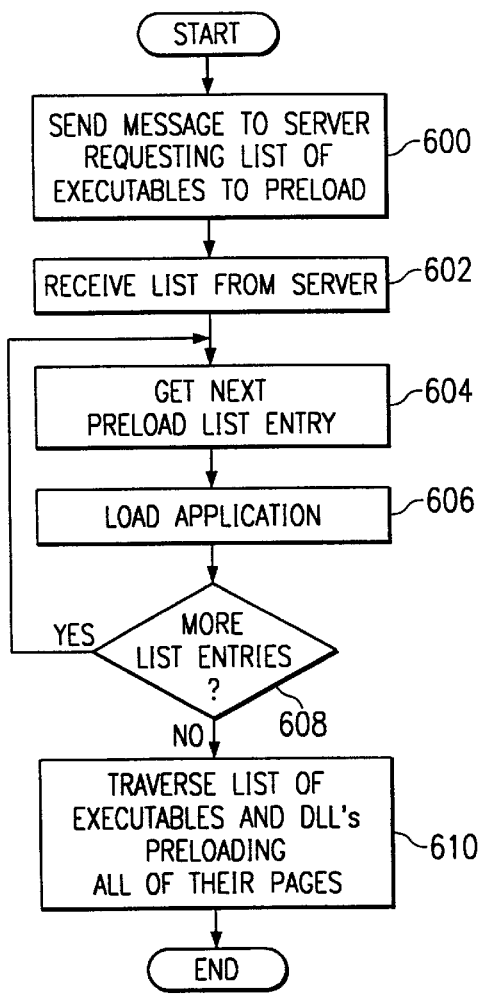
FIG. 6 is a flowchart of a process used by a network computer for determining which modules to pre-load in accordance with a preferred embodiment of the present invention.

Turning now to FIG. 6, a flowchart of a process used by a network computer for determining which modules to pre-load is illustrated in accordance with a preferred embodiment of the present invention. In the depicted example, the end user tells system administrator what applications will be used on the network computer. Of course, other mechanisms may be used such as having the system administrator select the applications. FIG. 6 is a more detailed description of steps 502 and 504 in FIG. 5. The process begins by sending a message to the server, requesting a list of modules or executable files to pre-load onto the network computer (step 600). In response to this request, a list of the modules is received from the server (step 602). The process then obtains the next pre-load entry on the list (step 604). The list of modules may take various forms depending on the implementation. A list may include, for example, the path and name of the module. Alternatively, the list may include the name of module and a list of pages from the module to load from. In this manner a network computer that has limited resources can have crucial portions of an application loaded while omitting pages that are not frequently used. Thereafter, the application or modules are loaded onto the network computer from the server (step 606). After loading of the application, a determination is made as to whether additional entries are present on the list (step 608). If additional entries are present, the process returns to step 604 to obtain the next entry. Otherwise, the list of executables and DLLs currently in use are traversed and all of the pages for these files are pre-loaded onto the network computer (step 610) with the process terminating thereafter. After pre-loading all of the pages for all applications, hibernation is used to save an image of the network computer.

Figure 7:
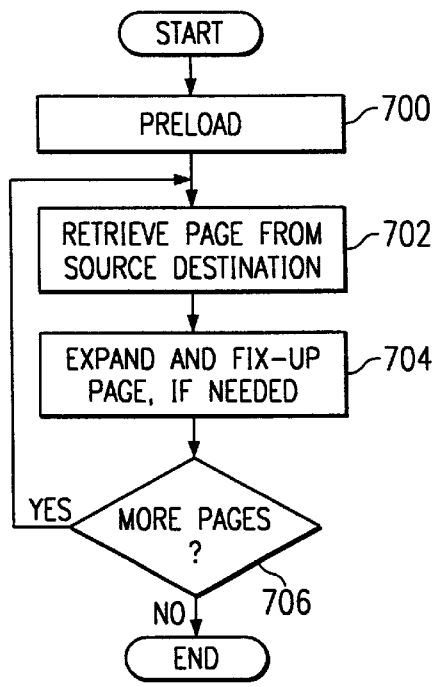
FIG. 7 is a flowchart of a process for pre-loading pages in accordance with a preferred embodiment of the present invention.

Turning next to FIG. 7, a flowchart of a process for pre-loading pages is depicted in accordance with a preferred embodiment of the present invention. FIG. 7 is a more detailed description of step 610 in FIG. 6. The process begins by receiving a request to pre-load pages (step 700). Thereafter, a page is retrieved from the source (the server) and across the network and stored in the network computer (step 702). After the page has been retrieved, the page is expanded and fixed up, if required (step 704). In the depicted example, pages may be retrieved from the module on the server and may be in a compressed form. In such an instance, decompression is performed so that each time the page is accessed by the network computer, it does not have to be uncompressed. Fix up of code occurs to provide any needed fix up of relocatable addresses referenced in the code. Such a feature allows for relocation of code in memory. A determination is then made as to whether additional pages are present for retrieval from the source (step 706). If additional pages are present for retrieval from the source, the process then returns to step 702 to retrieve the next page. Otherwise, the process of pre-loading pages is finished.

Figure 8:
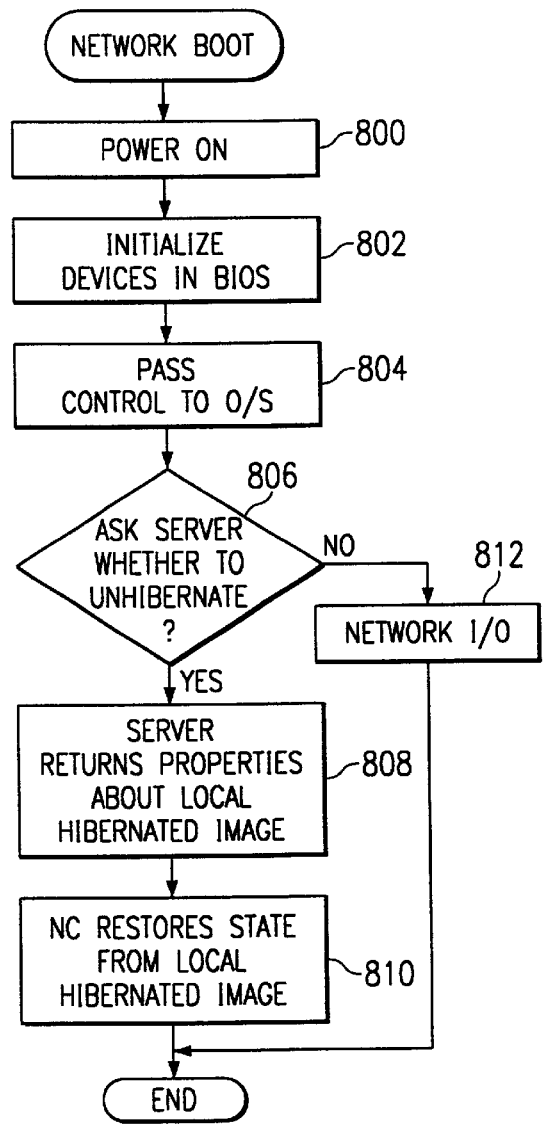
FIG. 8, a flowchart of a process for booting a network computer in accordance with a preferred embodiment of the present invention.
Figure 4:
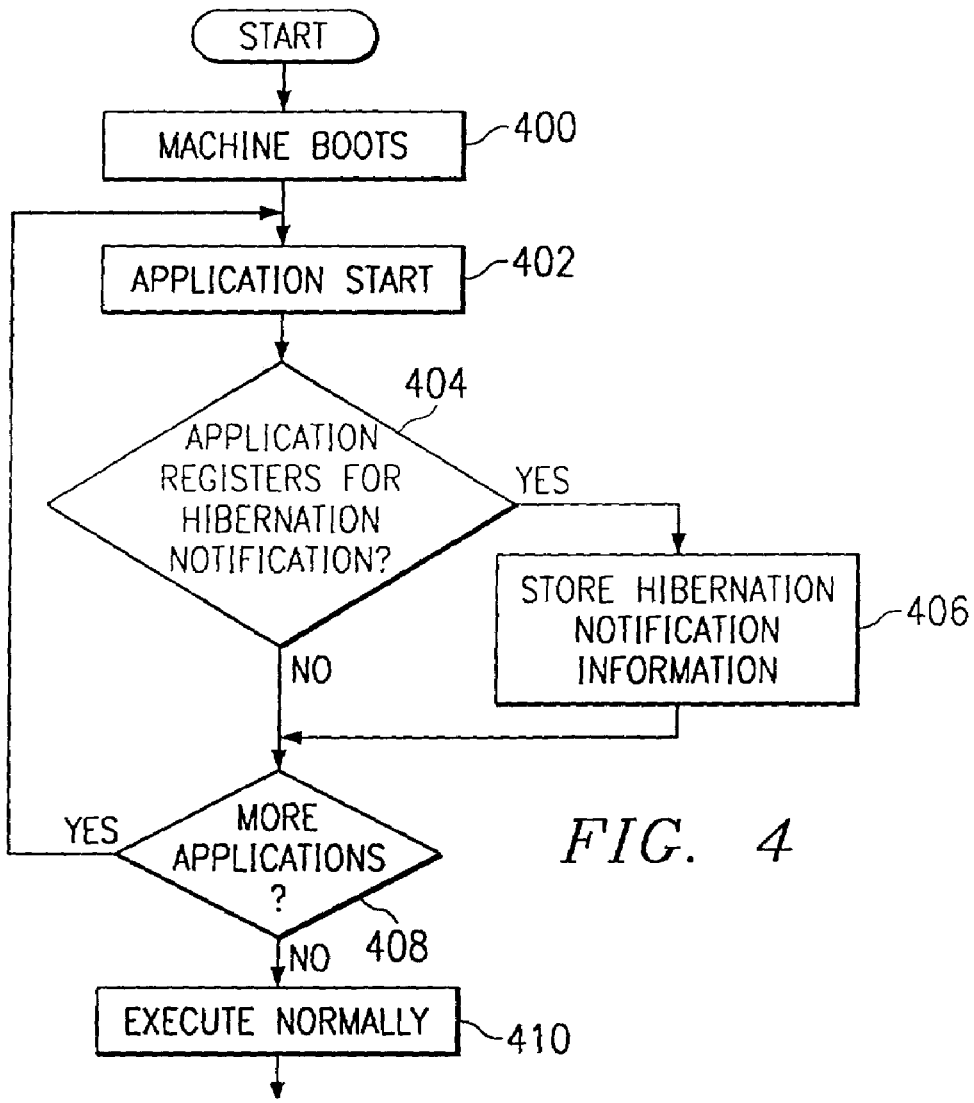
Figure 5:
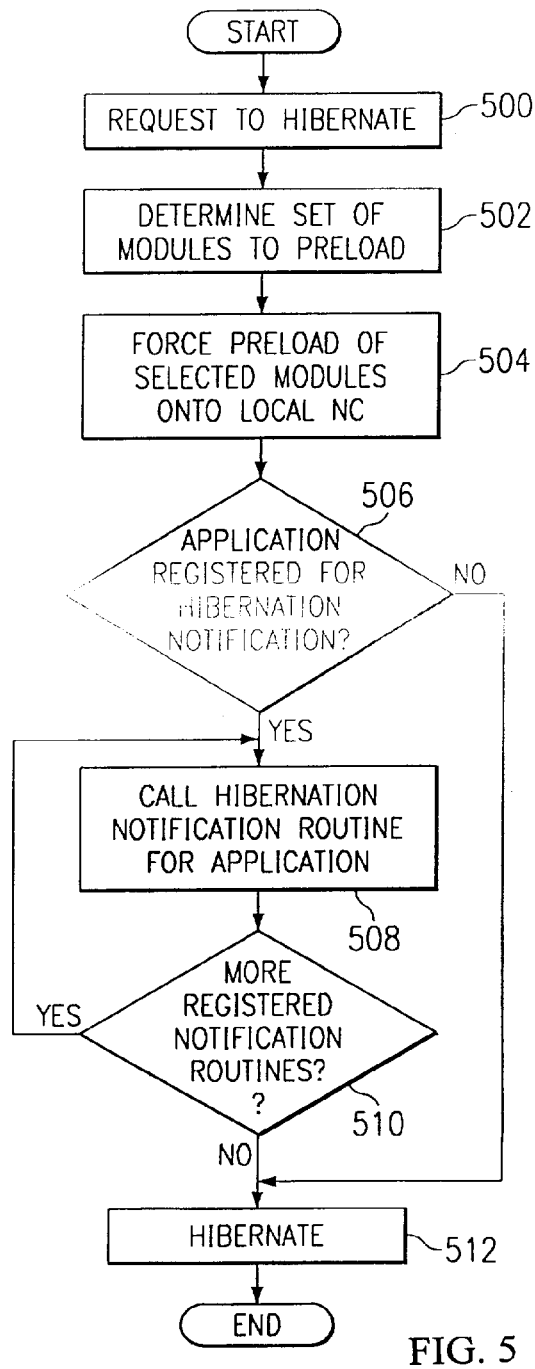

With reference now to FIG. 8, a flowchart of a process for booting a network computer is depicted in accordance with a preferred embodiment of the present invention. Process begins with a system event such as the power being turned on at the network computer (step 800). Thereafter, devices are initialized in the BIOS (step 802), and control is passed to the operating system (step 804). The network computer then polls the server to determine whether to unhibernate (step 806). The polling may be accomplished using a known network protocol. Unhibernate means to restore the stored state of the system back to the physical state, e.g. restore device states, load physical memory, and set paging space back to pre-hibernated state. If the NC is to unhibernate locally, the server returns information describing properties and location of the hibernated image (step 808). Examples of criteria that may be used by a server to determine whether to unhibernate locally or to use an image from the server include the addition of new devices to the hardware, changes in applications used by the network computer, or updates to operating systems. The network computer then restores itself to the desired state from the local hibernation image (step 810), with the boot process terminating thereafter.

With reference again to step 806, if the server indicates that a normal network boot is to be employed, normal network I/O occurs to remotely boot the NC (step 812) with the boot process terminating thereafter. The server may indicate that a normal network boot is to be employed in order to download new data, such as, for example, updated operating systems, applications, or configurations. Additionally, new applications may be loaded from the server to the NC. After a normal network boot, the NC may then be instructed to save an image of the system for hibernation using the processes of the present invention.

Thus, the present invention provides an improved method and apparatus for reducing the amount of network access needed to execute applications on a network computer. The present invention also decreases boot time and run time using the hibernation mechanism described above. The present invention provides this advantage by pre-loading pages for modules required for execution of applications at the time the NC is requested to hibernate. In addition, the present invention provides hibernation notification to registered applications, which allows an application to perform necessary tasks for hibernation. For example, when notified, a word processing program may pre-load macros in response to receiving hibernation notification, rather than waiting for a macro to be executed. This mechanism reduces the need to access the server at a later time for additional pages and eliminates the need for the network computer to re-load the application from the server each time the application is run.

It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media such as a floppy disc, a hard disk drive, a RAM, and CD-ROMs and transmission-type media such as digital and analog communications links.

The description of the present invention has been presented for purposes of illustration and description, but is not limited to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

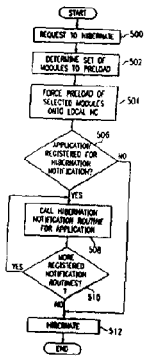

What is claimed is:

1. A method for reducing network traffic in a distributed data processing system, the method comprising:
    pre-loading a plurality of pages associated with an application onto a client data processing system from a server data processing system;
    hibernating the client data processing system after the plurality of pages has been pre-loaded onto the client data processing system to form an image containing the plurality of pages; and
executing the application using plurality of pages on the client data processing system, wherein the client data processing system is unhibernated, the application is executed using the image without accessing the server data processing system.

2. The method of claim 1, wherein each page is locally stored in a paging file within the client data processing system.

3. The method of claim 1, wherein the plurality of pages are in a compressed format and further comprising decompressing the plurality of pages.

4. The method of claim 1, wherein the step of hibernating the client data processing system includes notifying the application that hibernation of the client data processing system will occur.

5. A method in a data processing system for reducing time needed to access client images in a distributed data processing system, the method comprising:
    transferring a plurality of memory pages for an application from a server to a client, wherein the plurality of pages includes code needed to execute the application each time the application is started;
    storing the plurality of memory pages for the application within the client;
    accessing the stored plurality of memory pages when executing the application without accessing the server to execute the application;
    hiberating the client;
    unhibernating the client; and
    executing the application only using the plurality of pages stored within client.

6. The method of claim 5, wherein the plurality of memory pages is stored in a paging file within the client.

7. A method in a distributed data processing system for executing an application on a client data processing system, wherein the application is stored on a server and includes a plurality of portions, the method comprising:
    pre-loading the plurality of portions for the application onto a client data processing system from a server within the distributed data processing system;
    hibernating the client data processing system after the plurality of portions have been pre-loaded onto the client data processing system, wherein the plurality of portions for the application are stored within the client data processing system; and
    executing the application after unhibernating the client data processing system using the stored plurality of portions for the application without accessing the server data processing system to execute the application.

8. The method of claim 7, wherein the plurality of portions is a plurality of pages.

9. The method of claim 7, wherein the plurality of portions includes a number of executable files.

10. The method of claim 7, wherein the plurality of portions includes a number of dynamic-link library files.

11. A data processing system for reducing network traffic in a distributed data processing system, the data processing system comprising:
    pre-loading means for pre-loading a plurality of pages associated with an application onto a client data processing system from a server data processing system;
    hibernation means for hibernating the client data processing system after the plurality of pages has been pre-loaded onto the client data processing system to form an image containing the plurality of pages; and
    execution means for executing the application using plurality of pages on the client data processing system each time the application is run using the image without accessing the server data processing system.

12. The data processing system of claim 11, wherein each page is locally stored in a paging file within the client data processing system.

13. The data processing system of claim 11, wherein the plurality of pages is in a compressed format and further comprising decompression means for decompressing the plurality of pages.

14. The data processing system of claim 11, wherein the hibernation means includes notification means for notifying the application that hibernation of the client data processing system will occur.

15. A data processing system for reducing time needed to access client images in a distributed data processing system, the data processing system comprising:
    transferring means for transferring a plurality of memory pages for an application from a server to a client;
    storing means for storing the plurality of memory pages for an application within the client;
    accessing means for accessing the stored plurality of memory pages when executing the application without accessing the server to execute the application;
    hiberating means for hiberating the client;

unhiberating means for unhibernating the client; and executing means for executing the application only using the plurality of pages stored within client.

16. The data processing system of claim 15, wherein the plurality of memory pages is stored on a hard disk drive within the client.

17. The data processing system of claim 15, wherein the plurality of memory pages is stored on a tape drive within the client.

18. The data processing system of claim 15, wherein the plurality of memory pages is stored in a paging file within the client.

19. A data processing system for executing an application on a client data processing system, wherein the application is stored on a server and includes a plurality of portions, the data processing system comprising:

pre-loading means for pre-loading the plurality of portions for the application onto the client data processing system from a server within the distributed data processing system;

hibernation means for hibernating the client data processing system after the plurality of portions have been pre-loaded onto the data processing system, wherein the plurality of portions for the application are stored within the client data processing system; and execution means for executing the application after unhibernating the client data processing system, using the stored plurality of portions for the application without accessing the server to execute the application.

20. The data processing system of claim 19, wherein the plurality of portions is a plurality of pages.

21. The data processing system of claim 19, wherein the plurality of portions includes a number of executable files.

22. The data processing system of claim 19, wherein the plurality of portions includes a number of dynamic-link library files.

23. The data processing system of claim 19 further comprising notification means for notifying the application to prepare for hibernation after the pre-loading means has pre-loaded the plurality of pages.

24. A computer program product for executing an application on a client data processing system within a distributed data processing system, the computer program product comprising:

first instructions for pre-loading a plurality of pages associated with an application onto the client data processing system from a server data processing system;

second instructions for hibernating the client data processing system after the plurality of pages has been pre-loaded onto the client data processing system to form an image containing the plurality of pages; and third instructions for executing the application using the plurality of pages on the client data processing system after each time the application is executed using the image without accessing the server data processing system.

25. The computer program product of claim 24, further comprising fourth instructions for notifying the application that hibernation of the client data processing system will occur, wherein the application may prepare for hibernation.

* * * * *

UNITED STATES PATENT AND TRADEMARK OFFICE
CERTIFICATE OF CORRECTION

PATENT NO.     : 6,226,667 B1
DATED          : May 1, 2001
INVENTOR(S)    : Gareth Christopher Matthews et al.

It is certified that error appears in the above-identified patent and that said Letters Patent is hereby corrected as shown below:

<u>Title page,</u>
The Title page should be deleted and substitute therefore the attached Title page.

<u>Drawings,</u>
Delete Figs. 4 and 5 and substitute Figs. 4 and 5 as shown on the attached pages.

Signed and Sealed this

Twenty-third Day of July, 2002

Attest:

Attesting Officer

JAMES E. ROGAN
Director of the United States Patent and Trademark Office

United States Patent
Matthews et al.

(10) Patent No.: US 6,226,667 B1
(45) Date of Patent: *May 1, 2001

(54) METHOD AND APPARATUS FOR PRELOADING DATA IN A DISTRIBUTED DATA PROCESSING SYSTEM

(75) Inventors: Gareth Christopher Matthews, Cedar Park; David Medina, Austin; Allen Chester Wynn, Round Rock, all of TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 09/084,277

(22) Filed: May 26, 1998

(51) Int. Cl.$^7$ .............................. G06F 15/177; G06F 9/00
(52) U.S. Cl. ............................. 709/203; 709/203; 713/1
(58) Field of Search .............................. 709/220–222, 709/203, 228; 713/1–2, 100

(56) References Cited

U.S. PATENT DOCUMENTS

| | | | |
|---|---|---|---|
| 4,885,770 | * 12/1989 | Croll | 379/269 |
| 5,146,568 | * 9/1992 | Flaherty et al. | 716/3 |
| 5,367,688 | * 11/1994 | Croll | 713/2 |
| 5,404,527 | * 4/1995 | Irwin et al. | 709/222 |
| 5,444,850 | * 8/1995 | Chang | 709/222 |
| 5,452,454 | 9/1995 | Basu | 395/700 |
| 5,485,609 | * 1/1996 | Vitter et al. | 707/101 |
| 5,530,862 | * 6/1996 | Wadsworth et al. | 713/1 |
| 5,666,293 | * 9/1997 | Metz et al. | 709/220 |
| 5,708,820 | * 1/1998 | Park et al. | 713/323 |
| 5,715,456 | * 2/1998 | Bennett et al. | 713/2 |
| 5,752,042 | * 5/1998 | Cole et al. | 717/11 |
| 5,758,072 | * 5/1998 | Filepp et al. | 709/220 |
| 5,758,165 | 5/1998 | Shuff | 717/11 |
| 5,778,443 | 7/1998 | Swanberg et al. | 711/162 |
| 5,832,283 | 11/1998 | Chou et al. | 713/300 |
| 5,872,968 | 2/1999 | Knox et al. | 713/2 |
| 5,987,506 | 11/1999 | Carter et al. | 709/213 |
| 6,074,435 | * 6/2000 | Rojestal | 717/11 |
| 6,101,601 | * 8/2000 | Matthews et al. | 713/2 |
| 6,108,697 | * 8/2000 | Raymond et al. | 709/218 |
| 6,131,159 | * 10/2000 | Hecht et al. | 713/1 |
| 6,134,616 | * 10/2000 | Beatty | 710/104 |

OTHER PUBLICATIONS

Gralla, P., "How the Internet Works," Ziff–Davis Press, pp. 126–127, 1994.*

Bestavros, Azer "Using Speculation to Reduce Server Load and Service Time on the WWW", pp. 403–410, 1995 Computer CIKM International Conference On Information Communications Review and Knowledge Management. vol. 26, No. 3, pp. 22–36 Jul. 1996.

* cited by examiner

Primary Examiner—Zarni Maung
Assistant Examiner—Andrew Caldwell
(74) Attorney, Agent, or Firm—Duke W. Yee; Jeffrey S. LaBaw

(57) ABSTRACT

A method and apparatus for reducing time needed to initialize a data processing system and to execute applications on the data processing system. In accordance with a preferred embodiment of the present invention, pages for an application are pre-loaded onto a client from a server. The pre-loading of the application includes loading pages that will be required for execution of the application in preparation for hibernation. These pages may include other pages for executable code or data that will be used during execution of the application. Subsequently, the application is executed using the locally stored pages without having to retrieve pages from the server. In addition, an application is provided with an opportunity to prepare itself for hibernation via hibernation notification. For example, the application may read and process files from the server. This processing is done once prior to hibernation and is not required for later executions of the application.

25 Claims, 4 Drawing Sheets